United States Patent [19]

Fleming

[11] 3,897,539

[45] July 29, 1975

[54] TAIL GAS NITROGEN OXIDE ABATEMENT PROCESS

[75] Inventor: Donald K. Fleming, Park Ridge, Ill.

[73] Assignee: Institute of Gas Technology, Chicago, Ill.

[22] Filed: July 26, 1973

[21] Appl. No.: 382,821

Related U.S. Application Data

[63] Continuation-in-part of Ser. No. 188,895, Oct. 31, 1971, abandoned.

[52] U.S. Cl. ............... 423/235; 423/239; 23/288 F
[51] Int. Cl. ........................................ C01b 21/00
[58] Field of Search ................... 423/210, 235, 239; 23/288 F

[56] References Cited
UNITED STATES PATENTS 3,118,727   1/1964   Cohn ................................. 423/239
3,436,192   4/1969   Karlsson ........................... 423/244
3,615,196  10/1971   Welty et al. ...................... 423/244
3,795,730   3/1974   Kalvinskas ....................... 423/239

FOREIGN PATENTS OR APPLICATIONS 1,098,557   1/1968   United Kingdom ................. 423/244

*Primary Examiner*—O. R. Vertiz
*Assistant Examiner*—Eugene T. Wheelock

[57] ABSTRACT

A method and system for abating nitrogen oxide in tail gas from nitric acid production. The system includes a rotary wheel reactor which has a preheat zone to raise the temperature of the inlet tail gas stream to ignition temperature, and a reaction zone wherein the nitrogen oxides are reduce, and wherein heat of reaction is removed as it is generated for preheating said tail gas stream, and to also prevent heat buildup which would be damaging to the catalysts in the reactor and to ancillary material equipment.

6 Claims, 4 Drawing Figures

INVENTOR
Donald K. Fleming
BY
Dominik, Knechtel & Godula
ATTORNEYS

TAIL GAS NITROGEN OXIDE ABATEMENT PROCESS

This application is a continuation-in-part of Ser. No. 188,895, filed Oct. 31, 1971, now abandoned.

This invention relates to a method for abating nitrogen oxide by removing heat of reaction as it is generated and utilizing such heat to preheat a tail gas stream to ignition temperature. The invention also relates to a system of providing improved means for removing and utilizing such heat of reaction.

The art has recognized that tail gas or off-gas from nitric acid plants is a continuing pollutant problem, primarliy because of the nitrogen oxide contained therein. Such tail gas generally contains from about 2½ to about 3½ percent oxygen, less than 1 percent water, less than 0.5 percent nitrogen oxide and the balance nitrogen. The nitrogen oxides are primarily nitrogen dioxide and nitric oxide, and these nitrogen gases are the principal pollutants in tail gas streams. In particular, the nitric oxide content has attracted the most serious efforts by practitioners to abate their presence.

A recognized and effective process provides combining such tail gas streams with a reducing gas such as hydrogen, methane, natural gas, naphtha or the like; and then delivering such combined gas streams to a bed containing a platinum group metal catalyst such as platinum, palladium, rhodium or the like. The nitrogen oxide components are reduced in the presence of the catalyst by steps wherein nitrogen dioxide is converted to nitric oxide, carbon dioxide and water, a procedure called decolorization. The nitrogen dioxide imparts the typical reddish brown color to stack exhausts. The nitric oxide is colorless and it is converted to carbon dioxide, water and nitrogen in an abatement procedure. The foregoing catalytic processing was described by H. C. Andersen et al., Ind. Eng. Chem., 53, 199 (1961).

The oxygen present in the tail gas stream is also reduced, and the highly exothermic reaction provides the heat build up which damages catalyst and upstream equipment. Prior effors to counter these disadvantages ancillary included limiting the oxygen content and providing stagewise reduction with interstage coolers. Such efforts tend to be complex, costly and not sufficiently successful.

In order for the nitrogen oxide gases to be reduced in the foregoing reaction it is required that the tail gas stream be preheated to ignition temperatures. The particular ignition temperature depends on the reducing gas used in the process. A very popular reducing gas is natural gas because of economy and efficiency, and such natural gas requires preignition temperatures in excess of 800° F, depending in part on the catalyst which is used. The required preignition temperatures present no threat or challenge to the life of the catalyst or the ancillary material equipment used in the system. Temperature is a serious problem, however, in the reactor area where the highly exothermic catalytic reaction could result in temperatures in excess of 1200° F, and which could be substantially higher, depending on the oxygen content of the tail gas. These high reaction temperatures, up to about 1700°F, have created a serious problem in practicing this process because of damage to the catalyst and to ancillary material equipment used in the abatement procedure.

One important object of the present invention is to provide a method and system whereby the known catalytic combustion of tail gas streams may be employed without incurring serious disadvantages arising from generation of high reaction temperatures.

Another important object of the present invention is to provide a method and system wherein the heat of reaction generated in catalytic combustion of tail gas streams is continually removed and utilized to preheat the incoming tail gas stream for a simple and efficient operating means.

Still yet another important object of the present invention is to provide a method and system in which improved abatement of nitrogen oxide occurs through a procedure which in further advantage eliminates the need of previous components used in tail gas abatement such as waste heat boilers to thereby significantly simplify the procedure.

Still yet another important object of the present invention is an improved method and system for abating nitrogen oxide in tail gas streams wherein an improved catalytic reactor assembly can be selectively operated to control the rate of heat removal and utilization.

Still yet another important object of the present invention is a method and system for abating nitrogen oxide in tail gas streams wherein an improved combustion reactor assembly may have its catalytic content variously distributed to obtain different operating conditions in the combustion reaction.

The foregoing objects are now attained together with still other objects which will occur to practitioners from time to time by the invention of the following disclosure, including drawings, wherein.

Figure 1:
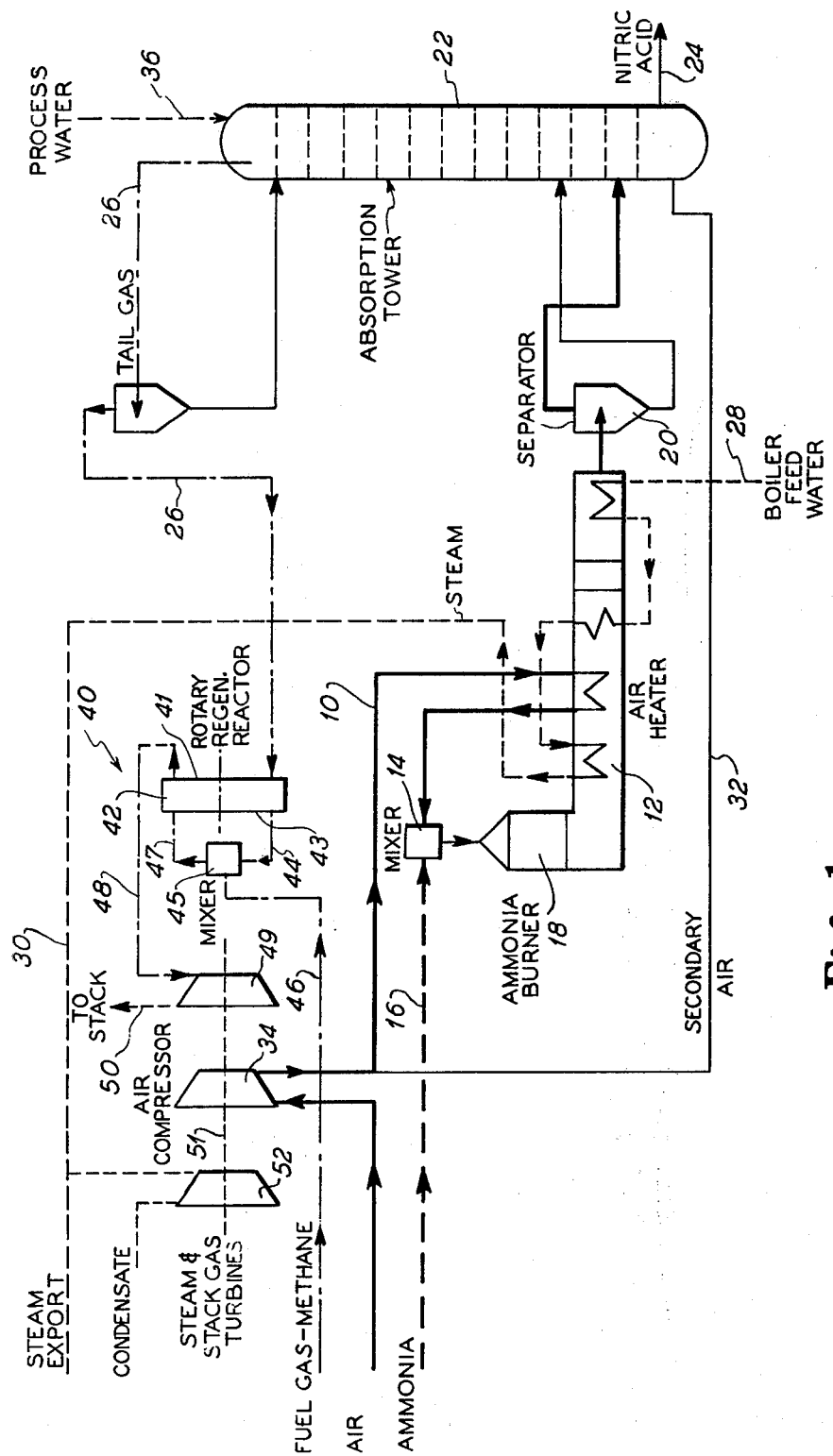
FIG. 1 is a schematic representation of a nitric acid production plant including the improved systems for abatement of nitric oxide.

The system and method of the present invention uses a rotary reactor in which a refractory wheel has distributed therethrough a catalyst. The heat of reaction is removed by the rotating refractory wheel as it is generated. The heat is absorbed primarily by the refractory material of the wheel. Such heat is then released in another zone of the wheel to preheat the incoming tail gas streams to ignition temperature. The system therefore allows advantageous utilization of heat which would otherwise curtail the useful life of the catalyst and damage ancillary material equipment used in the overall system. In this sense, the system feeds upon itself in that damaging temperature levels caused by the heat of reaction are removed and used to preheat the tail gas to ignition temperatures so that materials therein can be reduced in the combustion reaction.

The refractory wheel has a reaction zone wherein the preheated tail gas and reducing gas streams enter the refractory wheel. The wheel also has a preheat zone wherein tail gas alone is preheated. A point on the rotating wheel moves respectively through the reaction zone and the preheat zone. The present preferred embodiment provides that a point on the wheel takes longer to transverse the reaction zone than the preheat zone at a constant speed of rotation of the wheel.

The refractory wheel has the usual catalyst distributed therethrough, which is preferable a catalyst of the platinum metal group. By this is meant a catalyst such as platinum, palladium, rhodium, ruthenium, osmium and iridium, or a mixture of such metals. Conventional catalytic combustion occurs with a preheated tail gas stream combined with a reducing gas, but the exothermic reaction heat is removed, as it is generated, to the preheat zone for preheating a succeeding incoming stream of gas.

The reducing gas is oxidized as the nitrogen oxide is reduced in the oxidation-reduction reaction zone. The art has recognized that various preheating or ignition temperatures are required depending on the reducing gas employed. For example, preheat temperatures of about 900°F are recommended when natural gas is the reducing gas. Hydrogen requires an ignition temperature of about 850°F when burned together with methane, or an ignition temperature of about 400°F when burned alone. Naphtha requires an ignition temperature of about 750°F.

The particular identity of the reducing gas employed, and the particular ignition temperature selected are not critical in the sense that they are a part of the essential contribution of the present invention. Such gases and ignition temperatures are readily determined by the practitioner in accordance with the usual knowledge and skill available in this art. The contribution of the present invention is that heat of reaction is removed as generated and utilized in an adjoining preheat zone of the refractory wheel. The heat introduced into the preheat zone can be readily controlled by the practitioner by controlling the rate of rotation of the refractory wheel and selecting the dimensions of said refractory wheel, as well as selecting the refractory material itself. The reducing gas or fuel gas is generally combined with the preheated tail gas stream in slight stoichiometric excess, say about 10 percent excess.

The levels of oxygen and nitrogen oxide gas, or $NO_x$, in the tail gas stream reach reaction temperatures which can exceed 1500°F. Usual oxygen content in the tail gas streams of about 2.5 to about 3.5 percent results in extremely high reaction temperatures in present abatement processes. In the method of the present invention, heat of reaction is continually withdrawn to prevent the expected heat build up in the reaction zone irrespective of usual oxygen levels.

The refractory wheel may be formed in various ways now known in the art, including spirally forming a corrugated refractory strip such as aluminum or ceramics formed on an aluminum or other flexible support. The spirally wound wheel will then resemble somewhat a honeycomb type of refractory in which the catalyst is distributed therethrough substantially uniformly or otherwise. One such honeycomb material is supplied by the Du Pont Company under the trade designation TORVEX, the ceramic being catalyzed by known techniques. Another similar honeycomb material is supplied by the American Lava Company under the trade designation of ALSIMAG.

The catalyst may be homogenously mixed with a pulverulent refractory such as kaoline, clay and a metal. This mixture may be formed into a paste, formed into the wheel by various means and then fired. One method for preparing a ceramic body with catalyst in accordance with such a general procedure is disclosed in U.S. Pat. NO. 3,533,753. Another method for preparing ceramic catalyst bodies is disclosed in U.S. Pat. No. 3,397,154.

The scope of this invention also includes the selective distribution of catalysts in the refractory wheel to take advantage of different combustion reaction procedures. A major portion of the catalyst, for example, may be concentrated adjacent one face of the refractory wheel, and the opposite face remains substantially free of said catalyst. In such an embodiment, the substantially catalyst-free face is used primarily for heat transfer, whereas the opposite face is used primarily for reaction combustion. This embodiment would allow an incoming tail gas stream to be preheated to a higher ignition temperature so that lower cost non-noble metal catalysts can be used in the refractory wheel. It will be appreciated that if preheat temperatures of about 1500°F to about 1600°F are attained with the refractory wheel in some embodiments, then no catalyst is required, and the rotary reactor operates only as a regenerative heat transfer means. In such embodiments, refractory linings would be required in the ancillary material equipment of the system.

Referring now to the drawings, the schematic showing of FIG. 1 represents features commonly found in a nitric acid plant wherein air moves through line 10 to an air heater 12. Such a heater or preheater previously was used to also preheat the tail gas stream, but now such heat may be advantageously used in its totality for other purposes. The heated air moves into a mixer 14 which also receives ammonia through line 16. The mixture is then moved into an ammonia burner 18. The stream moves to a separator 20, and then into an absorption tower 22. Nitric acid leaves the absorption tower through line 24. Boiler feed water is introduced to the heater through line 28 and steam export occurs through line 30. Secondary air moves to the absorption tower through line 32 with the help of air compressor 34. Process water enters the absorption tower through line 36.

The rotary reactor assembly is provided in such a representative plant as indicated generally at 40 in the schematic. The tail gas stream leaves tower 22 through line 26, said stream having from 2 to 4 percent oxygen. The stream enters one face of refractory wheel 42, hereinafer referred to as the obverse face 41 of the refractory wheel 42 and passes through a preheat zone. The tail gas stream is preheated in this preheat zone to ignition temperatures from about 800°F to about 1000°F, and then leaves the opposite or the reverse face 43 of the wheel into a collecting line 44 which empties into mixing chamber 45. The reducing gas stream enters the mixer chamber through line 46 from a source not shown. The preheated combined gas stream then leaves the mixer chamber by way of line 47, and enters the reverse face 43 of the refractory wheel and passes through a reaction zone thereof. This combined gas stream could as well be passed through the reaction zone from the obverse face of the wheel 42, however, from the description below it will be seen that it is far more convenient to form the ducts to route this stream to enter the reverse face of the wheel. It is understood, however, that both countercurrent (obverse face) and cocurrent(reverse face) combined gas streams may be used.

The catalytic combustion in the reaction zone abates the nitric oxide content at reaction temperatures sufficient to effect desired levels of abatement. The high exothermic heat of reaction is, however, constantly removed as it is generated by the rotating wheel 42. The waste exhaust stream leaves the obverse face 41 of the wheel through the outlet line 48 which then exhausts such stream in any desired manner, including an expander 49 connected to a stack exhaust line 50. A turbine 52, as well as expander 49 and drive compressor 34, are mounted on common shaft 51.

Figure 2:
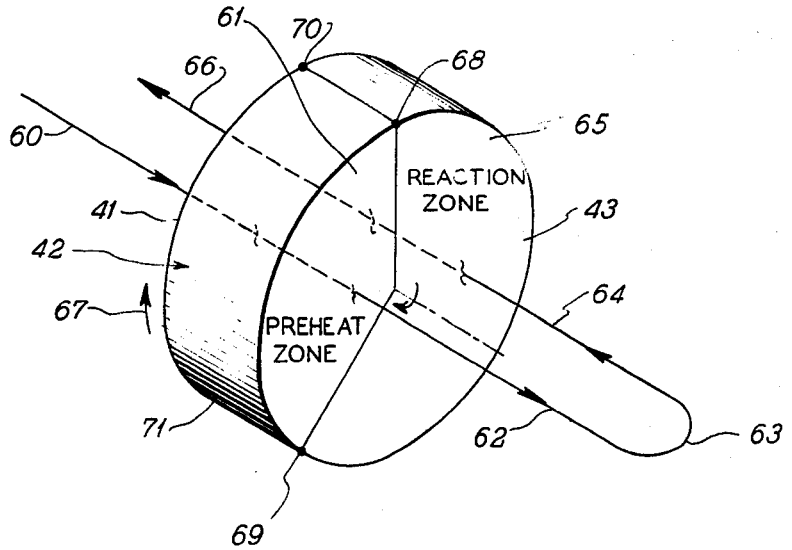
FIG. 2 is a highly schematic representation illustrating the improved catalytic reactor, and depicting the path of gas stream travel therethrough.

The schematic representation of FIG. 2 illustrates the path of the gas streams through the respective preheat and reaction zones of the rotating refractory whee. The path of the preheated tail gas stream is indicated by the line 60, and such path enters the wheel 42 at its obverse face 41 and passes through the preheat zone which is indicated by minor pie-shaped area 61. The tail gas stream preheated to ignition temperature leaves the reverse face 43 of the wheel along path 62. Such preheated tail gas stream is mixed with the reducing gas at the turn indicated at 63, and such combined preheated gas stream is then, in the illustrated embodiment, returned towards the reverse face of the wheel along the path indicated as 64. The preheated combined gas stream passes through the reaction zone which is indicated by the major pie-shaped area 65. It s seen that this reaction zone area is made up of the balance of the total area of the wheel not taken up by the area forming the preheat zone. While the reaction zone is shown as a major portion of the total area of the wheel, it may very well be otherwise. Catalytic combustion occurs in the reaction zone of the wheel, and the waste exhaust gases leave the obverse face 41 of the wheel along the path indicated as 66.

The direction in which the wheel rotates is indicated by the arrow at 67. The illustrated embodiment further indicates that an imaginary point fixed on the face of the wheel, at the periphery thereof, takes longer to traverse the major reaction zone than the minor preheat zone in completing a 360° rotation at a given velocity. This traversing point represents a removal of generated heat from the reaction zone to the preheat zone during rotation of the wheel. Various temperature levels at different points on the two faces of the wheel may now be approximately illustrated to further understand the advantages of the invention.

A tail gas stream having an oxygen content of 3.5 percent is preheated to an average ignition temperature of about 900°-950°F in passing through the preheat zone of the wheel. Following catalytic combustion in the reaction zone, the exhaust leaves the obverse face of the wheel at average temperatures of about 1020°F. The temperature varies at the reverse face as the wheel rotates, for example, at the beginning point indicated at 68 and the completion point indicated at 69. It may be assumed that the temperature cools from about 1000°F to about 900°F from point 69 to point 68; and the increases from about 900°F to about 1000° F from the point 68 to the point 69, with respect to the illustrated countercurrent flow. Greater temperature variation usually occurs on the obverse face of the wheel, and it may be assumed that the temperature at the obverse face at the point 70 is about 750°F, and at the point 71 the temperature is about 1150°F. The tail gas stream which moves through the preheat zone is heated, therefore, at different temperature levels therein, but the average temperature of the tail gas stream leaving said preheat zone may be viewed as being an average of about 860°F. It will be appreciated that similar temperature changes, but of a different order, will operate with other reducing gears, such as napthas or ammonia.

Figure 3:
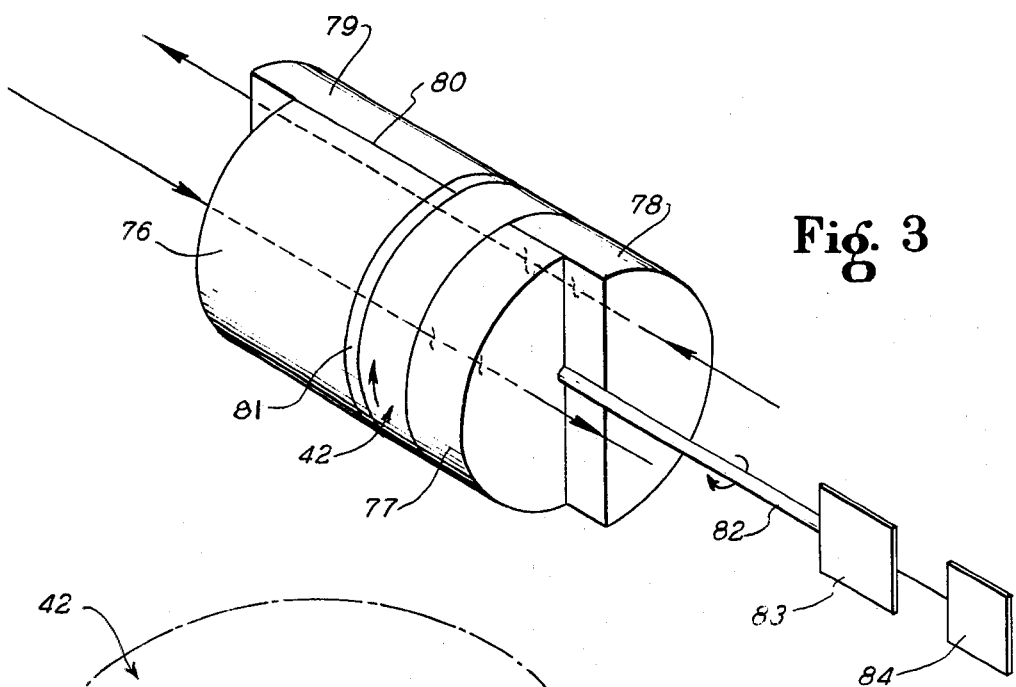
FIG. 3 is a highly schematic representation of the improved reactor assembly used in the improved system.

The schematic representation of FIG. 3. represents greater details of the rotary reactor assembly. A delivery duct means 76 adjoins the obverse face of the wheel 42. The tail gas stream moves through the delivery duct means into the preheat zone, and then passes through collecting duct means 77 which adjoins the reverse face of the wheel 42. A communicating duct means, which is not shown in this view but which has been indicated in the schematic view of FIG. 1, then delivers the mixed gas stream into inlet duct means 78. The mixed gas stream moves into the reaction zone of the wheel at the reverse face, and then the exhaust or waste gas enters the outlet duct means 79 at the obverse face of the wheel.

The configurations of the ducts correspond to that of the zones which the ducts adjoin. Here, it is seen that the delivery and outlet duct means are of complementary semi-circular configuration to thereby form a generally circular configuration conforming to the diameter of the wheel. Likewise, the collecting and inlet duct means are complementary to each other and form a similar circular configuration conforming to the diameter of the wheel. An annular seal 81 is positioned between the duct opening and each face of the wheel, only one of such bearing seals being indicated in the view of FIG. 3. A similar seal 80 is also present between the complementary duct means on each face of the wheel, again only one of said seals on one side being shown.

The above described duct means are fixed and the wheel is rotated at desired speeds with respect to them, by means such as the schematically indicated shaft 82 shown fixed to the center of the wheel, such shaft being rotated by motor 83 which is joined to control means 84 for adjusting the rotational speed.

Figure 4:
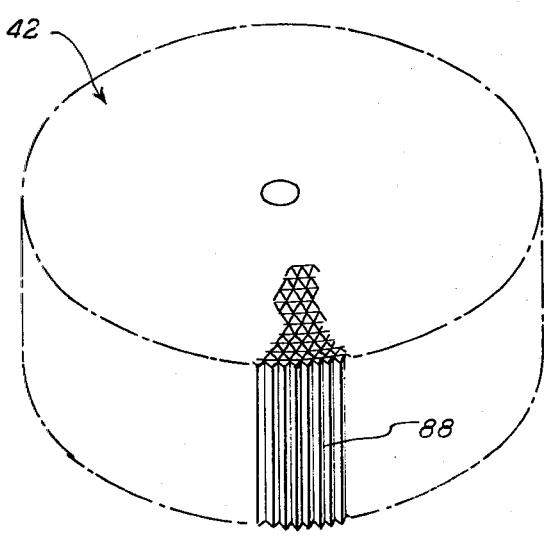
FIG. 4 is a perspective view of the reactor component showing only portional details in a somewhat schematic manner.

The refractory wheel used in the rotary reactor assembly may be formed and constructed in a variety of ways as previously indicated. A specific embodiment of one such wheel is illustrated somewhat schematically in the view of FIG. 4. The wheel is constructed into a disc formed by spirally forming or winding corrugated metal or ceramic strips, the outermost strip being indicated at 88 with a plurality of corrugations shown as extending between the opposite faces. The porosity of the rotary regnerator is therefore attained by the plurality of adjoining corrugations. Catalytic material may be distributed substantially uniformly throughout the porous means or passageways formed by the group of corrugations adjoining one another. In the alternative, the catalytic material may be selectively distributed so that it is concentrated towards one face, and the other face is substantially free of the catalyst, as previously described.

The foregoing rotary reactor assembly used in the method and system now allows catalytic combustion of nitric oxides in tail gas streams without the expected levels of damage to catalysts and ancillary material equipment. Without such a rotary reactor assembly, outlet temperatures of tail gas streams with 2 percent oxygen could be about 1370°F, and tail gas streams with a 3 percent oxygen content could result in outlet temperatires of about 1590°F. Such temperatures are clearly counterindicated with respect to material equipment damage since current turbo expanders, for example, have maximum temperature tolerations of 1200°F. The noble metal catalysts have limitations of 1500°–1600°F; accordingly, abatement of tail gas streams could not be sufficiently effected with such prior art systems unless the oxygen content wewre reduced or maintained at levels of below about 2.5 percent.

As stated, the overall wheel size may be controlled by the heat transfer rate, the chemical reaction rate, or the combination of both. The preheat section of the wheel is controlled only by the heat transfer rate. The size of the preheat area can be predetermined by considering correlations for regeneration heat exchange in the widely known text, *Heat Transfer*, Volume II, M. Jakob. Based on short cycles of 5–10 minutes, the effective reduced length of a regenerative exchange can be determined as a function of the thermal efficiency required. Such a reduced length is related to the effective heat transfer in units of BTU's/hr-sq ft-°F. Adopting a conservative heat transfer coefficient of 20 would lead to an exchange volume requirement of 1.75 cubic feet for the preheat section of the wheel in a 100 ton per day nitric acid plant. It is estimated that the reaction zone volume would be cubic feet, therefore, total volume would be 7.75 cubic feet. Such a wheel could be divided into a preheat zone area which is the remaining 78 percent of the total face area.

The claims of the invention are now presented as a statement of the invention, which should be interpreted through the terms used as given further meaning by the foregoing disclosure.

What is claimed is:

1. A method for abating nitrogen oxide in a tail gas stream which includes the steps of delivering a tail gas waste stream containing nitrogen oxide to the obverse face of a rotating refractory wheel, said refractory wheel having communicating pathways from the obverse face to a reverse face, and divided into a preheat zone for preheating the gas stream and a reaction zone for treating the gas stream by an oxidation-reduction reaction, said gas stream being preheated at said preheat zone of said wheel, collecting said tail gas stream at the reverse face of the rotating wheel after movement through said preheat zone, said tail gas being preheated to ignition temperature, combining said preheated tail gas stream with a stream of reducing gas, moving said combined stream through the reaction zone of the wheel to reduce the nitrogen oxide in said tail gas stream at a reaction temperature which upper limit is sufficiently low to substantially reduce thermal damage to the materials used, the heat or reaction developed at said reaction zone moving with the wheel to the preheat zone to again preheat a delivered tail gas stream, and collecting an exhaust gas stream at a reduced outlet temperature after movement through said reaction zone wherein abatement of nitrogen oxide occurs.

2. A method includes the steps of claim 1 above wherein said various streams move in a path substantially normal to the faces of said wheel, said tail gas stream entering one face at an area of the preheat zone and leaving the opposite face following preheating, said tail gas re-entering said wheel at an area of the reaction zone and thereafter leaving the wheel after passing through the reaction zone in it as an exhaust gas.

3. A method which includes the steps of claim 2 above wherein a catalyst is distributed through the material of the refractory wheel.

4. A method which includes the steps of claim 3 above wherein said tail gas stream is delivered with an oxygen content from about 2 to about 4 percent by weight, wherein said tail gas is preheated from about 800°F to about 1000°F after passing through the preheat zone, and wherein said exhaust gas leaves the wheel after passing through said reaction zone at a reaction temperature of less than about 1200°F.

5. A method which includes the steps of claim 3 above wherein said refractory wheel is a unitary ceramic body having the catalyst distributed substantially uniformly therethrough, said catalyst being a platinum group metal.

6. A method which includes the steps of claim 5 above wherein said stream of reducing gas is natural gas.

* * * * *